Patented Apr. 28, 1936

2,038,574

UNITED STATES PATENT OFFICE 2,038,574

MANUFACTURE OF DIARYLAMINES

Frederick H. Kranz, Buffalo, N. Y., assignor to National Aniline & Chemical Company, New York, N. Y., a corporation of New York No Drawing. Application February 11, 1933, Serial No. 656,377

17 Claims. (Cl. 260—128)

This invention relates to the production of N-arylnaphthylamines. It relates particularly to improvements in the production of N-arylnaphthylamines by heating a naphthylamine, and especially alpha-naphthylamine, with another arylamine, especially an arylamine of the benzene series, in the presence of a catalyst. The invention also includes a new phenyl derivative of alpha-naphthylamine.

Three general methods are known to the art for the production of N-arylnaphthylamines; namely, (1) condensing an aminonaphthalene (alpha- or beta-naphthylamine) with another primary arylamine in the presence of a catalyst; (2) reacting an aminonaphthalene with a halogenated hydrocarbon or derivative; and (3) condensing a naphthol with a primary arylamine.

In the manufacture of N-arylnaphthylamines in accordance with the first of these methods, it has heretofore been the practice to heat a mixture of the aminonaphthalene and the other primary arylamine at a relatively high temperature in the presence of a small amount of an acid, or acid-forming, material which is not decomposed at the temperature of the reaction and which does not promote side reactions, as a catalyst. Thus, in the manufacture of N-phenyl-alpha-naphthylamine it has heretofore been the general custom to heat a mixture of alpha-naphthylamine and aniline at 230° C. in the presence of a small amount of iodine as a catalyst.

I have found, according to the present invention, in the manufacture of an N-arylnaphthylamine by the condensation of an aminonaphthalene with another primary arylamine, and particularly with a primary arylamine of the benzene series, in the presence of a small amount of a catalyst, that the process can be materially improved by modifying the reaction conditions and method of procedure formerly employed. Thus, I have found, in accordance with the present invention, the formation of tar and other by-products which harmfully affect the yield and quality of the product can be reduced by carrying out the reaction at lower temperatures than those formerly employed, and by maintaining the reaction mixture in an actively boiling condition throughout the greater portion of the reaction period so as to eliminate from the reaction mixture ammonia produced as the result of the condensation which occurs. I have also found that a new N-aryl-alpha-naphthylamine may be produced in accordance with said process; namely, o-ethoxyphenyl-alpha-naphthylamine, which is useful as an intermediate product for the manufacture of dyestuffs and other products.

The invention accordingly comprises the steps and the relation of steps which will be exemplified in the process hereinafter disclosed, and the product having the characteristics and properties which will be exemplified in the product hereinafter disclosed. The scope of the invention will be indicated in the claims.

In the practice of the present invention a primary arylamine, preferably of the benzene series, which is free from an acid salt-forming group (specifically, a sulfo or carboxyl group) is actively boiled with an aminonaphthalene in a reaction mixture containing a catalyst for the reaction and an innocuous substance which is liquid under the conditions of the reaction, as a solvent or diluent. The latter substance is of such a nature and is used in such amounts that the boiling temperature of the reaction mixture is maintained, at least throughout the greater portion of the reaction period, at a temperature considerably below the boiling temperature of the N-arylnaphthylamine produced.

As an illustrative embodiment of a manner in which the invention may be practiced, the following examples are presented. The parts are by weight:

*Example 1.*—A mixture of 100 parts of alpha-naphthylamine, 166 parts of p-phenetidine (4-ethoxy-1-aminobenzene), 75 parts toluene and 0.35 part of iodine is heated at substantially atmospheric pressure in a suitable reaction vessel until the boiling temperature of the mixture is 194°–195° C. The volatile material which distills off during this heating operation is condensed in a suitable condenser connected to the vessel and the condensate is withdrawn. When the boiling temperature of the reaction mixture is about 195° C., the reaction vessel is connected with a reflux condenser and the vapors then generated by the boiling of the reaction mixture are condensed by the reflux condenser and continuously returned to the reaction mixture. The reflux condenser, which is provided with a vent to the atmosphere, is maintained at a temperature (about 70°–90° C.) adapted to condense the liquid constituents of the vapor mixture while permitting the ammonia, and any other gases if present with the vapors, to pass off through the vent. The reaction mixture is then boiled in this manner, with condensation and reflux of vaporized liquid, at substantially atmospheric pressure until substantially no more alpha-naphthylamine remains (approximately 24 hours), the temperature of the boiling mixture rising to about 197° C. The reaction mixture is then made slightly alkaline by the addition of aqueous sodium hydroxide, is subjected to fractional distillation under diminished pressure to remove toluene and residual p-phenetidine, and the fraction boiling at 250° to 270° C. at 20 mm. pressure is separately collected. It comprises p-ethoxyphenyl-alpha-naphthylamine having a melting point of 85° to 87° C. The yield, based upon the alpha-naphthylamine used, is about 85 per cent. of that theoretically obtainable.

Although p-phenetidine boils at about 254° C., alpha-naphthylamine boils at about 300° C., and p-ethoxyphenyl-alpha-naphthylamine boils at a still higher temperature, the toluene lowers the boiling point of the reaction mixture to a temperature considerably below these temperatures, and permits active boiling of the reaction mixture to be secured at a sufficiently low temperature to avoid undesired decomposition and formation of tar. The boiling of the reaction mixture assists in removing from the field of reaction ammonia produced as a result of the condensation reaction, and thereby permits the reaction to be carried out at low temperatures not otherwise commercially practicable.

*Example 2.*—A mixture of 71.5 parts of alpha-naphthylamine, 119.3 parts of o-phenetidine, 75 parts of monochlorbenzene, and 0.25 part of iodine is heated at atmospheric pressure in a suitable reaction vessel until the boiling point of the mixture reaches about 190° C. Vapors of chlorbenzene which distill from the mixture are condensed and withdrawn. The reaction vessel is then connected with a reflux condenser, and boiling of the reaction mixture at said temperature is continued at substantially atmospheric pressure for about 24 hours, with condensation and reflux of vapors while withdrawing ammonia generated by the reaction, in the manner described in Example 1. The reaction mixture is then cooled to 100° C., a solution of 1 part of sodium hydroxide in 5 parts of water is added, and the mixture is subjected to fractional distillation. The fraction boiling at 230° to 232° C. under 10 to 12 mm. pressure, which comprises the o-ethoxyphenyl-alpha-naphthylamine resulting from the reaction, is separately collected. After purification by crystallization from alcohol, it is in the form of a white solid melting at 58°–59° C., practically insoluble in water, but soluble in alcohol, benzene and other organic solvents. It has the following probable formula:

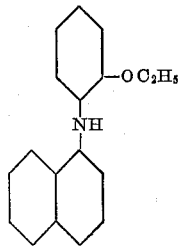

and is useful as an intermediate in the preparation of dyestuffs; for example, upon condensation with Michler's ketone in toluene with the aid of phosphorus oxychloride it forms a blue triphenylmethane dye of particular value for the dyeing of wool.

*Example 3.*—A mixture of 143 parts of beta-naphthylamine (2 - amino - naphthalene), 175 parts of p-toluidine, 115 parts of o-chlortoluene, and 0.5 part of iodine is heated at atmospheric pressure until the boiling point of the reaction mixture reaches 192° C., o-chlortoluene which distills being recovered and separately collected. The mixture is then boiled at substantially atmospheric pressure, with condensation and reflux of vapors while withdrawing ammonia generated by the reaction in the manner described in Example 1, for about 36 hours, during which time the boiling point of the mixture slowly rises to about 198° C. The reaction mixture is then cooled to 100° C., 2 parts of a 25 per cent aqueous caustic soda solution is added, and the mixture is then subjected to fractional distillation at a pressure of 8 to 10 mm. The fraction boiling between 232° and 235° C., which comprises crude p-tolyl-beta-naphthylamine, is separately collected. It has a melting point of 98.5°–100° C.

It will be apparent to those skilled in the art that the invention is not limited to the details of the above specific examples but that various changes may be made in the reagents employed and their proportions, in the method of procedure, reaction conditions, and other details of the process within the scope of the appended patent claims, which claims are to be limited only by the prior art.

Thus, another primary arylamine which is free from an acid salt-forming group (and especially a sulfonic acid or carboxyl group) may be employed in place of the phenetidines and/or p-toluidine of the above examples, such as aniline or another homologue or another nuclear-substituted derivative of aniline or a homologue of aniline; as for example, an aminonaphthalene, o-toluidine, a xylidine, an anisidine (o- or p-methoxy-aminobenzene), etc. The invention is particularly of value in connection with the preparation of N-arylnaphthylamines in which the aryl radical is derived from a primary amine of the benbene series free from an acid salt-forming group, and is especially advantageous in the production of N-aryl-alpha-naphthylamines by the interaction of alpha-naphthylamine with a primary amine of the benzene series having the formula:

$$C_6H_3X_2NH_2$$

in which X represents hydrogen, an alkyl group or an alkoxy group.

The temperatures at which the reactions are carried out also are not limited to those given in the above examples. The reaction is preferably carried out, however, at a temperature maintained materially below the boiling point of the product at the pressure employed. The products of the above examples have boiling points of 230° C. or higher at low pressures (20 mm. or less), which correspond with boiling points in the neighborhood of 400° C. at atmospheric pressure. It is therefore evident from the examples that the reaction is carried out at temperatures considerably below the boiling point of the product, that is, of the order of 200° C. below the boiling point of the product, at atmospheric pressure. Thus, in the production of an N-arylnaphthylamine from alpha- or beta-naphthylamine and a primary amine of the benzene series, free from an acid salt-forming group, the reaction mixture is preferably maintained, at least throughout the greater portion of the reaction period and preferably throughout substantially the whole reaction period, at a temperature within the range of about 185° C. and about 210° C.

The process may be carried out with the aid of other catalytically acting acid, or acid-forming, materials which do not promote side reactions with the other substances present in the reaction mixture and which remain in the reaction mixture during the reaction. Thus, hydrogen or ammonium iodides, chlorides and bromides may be employed instead of the iodine of the above examples. Iodine and the iodides are preferred, however. Furthermore, the amount of catalyst used may vary, as is well known in the art.

The toluene, monochlorbenzene and o-chlortoluene employed in Examples 1, 2 and 3, respectively, to maintain the boiling point of the reaction mixture within the desired temperature limits may be replaced by any other suitable substance which is liquid under the conditions of the reaction; which boils at atmospheric pressure at a sufficiently low temperature, alone or in combination with the other ingredients of the reaction mixture, to maintain the boiling point of the reaction mixture within the desired temperature limits; and which is innocuous to the other ingredients of the reaction mixture, that is, does not interfere with the desired reaction. The said substance may be normally a solid or a liquid, so long as it is liquid under the conditions of the reaction. It may be a solvent for some or all of the reaction ingredients, or it may merely be a diluent for the reaction mixture. Thus, other hydrocarbons (preferably of the aromatic series and especially of the benzene series) and other substituted hydrocarbons (preferably halogen-substituted paraffin, and aromatic, hydrocarbons and especially of the benzene series) which fulfill the above requirements may be employed; as for example, the dichlorbenzenes, the trichlorobenzenes, etc.

In order to maintain the boiling temperature of the reaction mixture within the desired temperature range, vapors given off from the boiling reaction mixture may be condensed and the condensate may be returned to the reaction mixture as described in the above examples. The process may be carried out alternatively, however, by withdrawing the condensate of vapors given off from the reaction mixture and adding to the reaction mixture, either continuously or intermittently, the required amount of inert liquid or other innocuous substance to maintain the boiling point of the reaction mixture within the desired temperature range.

It is not essential that the said substance be inert with respect to the other ingredients of the reaction mixture, as are the toluene, chlorobenzene, and o-chlortoluene of the above examples, although it should be innocuous thereto. Thus, in some cases, one of the reacting ingredients may be employed as the innocuous substance in suitable amount to maintain the boiling point of the resulting reaction mixture within the desired temperature limits. For example, in the production of phenylnaphthylamines, tolylnaphthylamines, etc. from aniline, or a toluidine, etc. and an aminonaphthalene, the aniline or other arylamine may be employed in such excess of the amount theoretically required as will maintain the boiling temperature of the reaction mixture within the desired temperature limits; as illustrated by the following specific example in which the parts are by weight.

*Example 4.*—A mixture of 143 parts of alpha-naphthylamine (1 mol.), 200 parts of aniline (2.15 mols) and 0.5 parts of iodine is heated and boiled in a suitable reaction vessel until the boiling temperature of the mixture is 192° to 193° C. at substantially atmospheric pressure, any vapors evolved being condensed and withdrawn. The reaction vessel is then connected with a reflux condenser, and the reaction mixture is actively boiled at substantially atmospheric pressure with condensation and reflux of vapors while withdrawing ammonia generated by the reaction, in the manner described in Example 1. When substantially no more alpha-naphthylamine remains in the reaction mixture (approximately twenty-four hours), the reaction mixture is made slightly alkaline by the addition of aqueous sodium hydroxide and is fractionally distilled under diminished pressure. The portion boiling at 205° to 210° C. under a pressure of 12 to 15 mm. is separately collected. It comprises N-phenyl-alpha-naphthylamine and has a melting point of 59° to 60° C. The yield based upon the alpha-naphthylamine used, is about 85 per cent. of that theoretically obtainable.

I claim:

1. In the production of an N-arylnaphthylamine by reacting an aminonaphthalene with a primary amine of the benzene series which is free from an acid salt-forming group in the presence of a catalyst for the reaction, the improvement which comprises refluxing at the boiling temperature and at substantially atmospheric pressure a reaction mixture containing the said aminonaphthalene, primary amine and catalyst, and an amount of an innocuous substance such that the boiling temperature of said reaction mixture is maintained within the range of about 185° C. to about 210° C., said innocous substance being liquid under the conditions of the reaction.

2. In the production of an N-arylnaphthylamine by reacting an aminonaphthalene with another primary arylamine which is free from an acid salt-forming group in the presence of a catalyst for the reaction, the improvement which comprises heating at the boiling temperature and at substantially atmospheric pressure a reaction mixture containing the said aminonaphthalene, primary arylamine and catalyst, and an amount of an inert substance such that the boiling temperature of said reaction mixture is considerably below the boiling temperature of the resulting N-arylnaphthylamine, said inert substance being liquid under the conditions of the reaction, and continuing the heating while maintaining said inert substance in said reaction mixture in an amount that will maintain the boiling temperature of said reaction mixture considerably below the boiling temperature of said resulting N-arylnaphthylamine.

3. In the production of an N-arylnaphthylamine by reacting an aminonaphthalene with another primary arylamine which is free from an acid salt-forming group, in the presence of a catalyst for the reaction, the improvement which comprises heating at the boiling temperature and at substantially atmospheric pressure a reaction mixture containing the aminonaphthalene, the primary arylamine, the catalyst, and an inert organic liquid in such an amount that the boiling temperature of said reaction mixture is considerably below the boiling temperature of the resulting N-arylnaphthylamine, and continuing the heating while maintaining said inert organic liquid in said reaction mixture in an amount that will maintain the boiling temperature of said reaction mixture considerably below the boiling temperature of said resulting N-arylnaphthylamine.

4. In the production of an N-arylnaphthylamine by reacting an aminonaphthalene with a primary amine of the benzene series which is free from an acid salt-forming group in the presence of a catalyst for the reaction, the improvement which comprises heating at the boiling temperature and at substantially atmospheric pressure a reaction mixture containing the said aminonaphthalene, primary amine and catalyst, and an amount of an innocuous substance such that the boiling temperature of said reaction mixture is within the range of about 185° C. to about 210° C., said innocuous substance being liquid under the conditions of the reaction and continuing said boiling while adding said innocuous substance to the reaction mixture in amounts that will maintain the boiling temperature within said temperature range.

5. In the production of an N-arylnaphthylamine by heating an aminonaphthalene with another primary arylamine which is free from an acid salt-forming group in the presence of a catalyst for the reaction, the improvement which comprises refluxing at the boiling temperature and at substantially atmospheric pressure a reaction mixture containing the said aminonaphthalene, primary arylamine, and catalyst, and an innocuous organic liquid in such an amount that the boiling temperature of the resulting reaction mixture is within the range of about 185° C. to about 210° C.

6. In the production of an N-aryl-alpha-naphthylamine by reacting alpha-naphthylamine with another primary arylamine free from an acid salt-forming group in the presence of a catalyst for the reaction, the improvement which comprises heating at the boiling temperature and at substantially atmospheric pressure a reaction mixture containing the said alpha-naphthylamine, primary arylamine and catalyst, and an amount of an inert substance such that the boiling temperature of said reaction mixture is considerably below the boiling temperature of the resulting N-aryl-alpha-naphthylamine, said inert substance being liquid under the conditions of the reaction.

7. In the production of an N-aryl-alpha-naphthylamine by reacting alpha-naphthylamine with a primary amine of the benzene series free from an acid salt-forming group in the presence of a catalyst for the reaction, the improvement which comprises heating at the boiling temperature and at substantially atmospheric pressure a reaction mixture containing the said alpha-naphthylamine, primary amine and catalyst, and an innocuous organic liquid in such an amount that the boiling temperature of the resulting reaction mixture is within the range of about 185° C. to about 195° C., and condensing and returning to the reaction mixture vapors given off by the boiling reaction mixture while removing ammonia from said vapors.

8. In the production of an N-aryl-alpha-naphthylamine by reacting alpha-naphthylamine with a primary amine of the benzene series free from an acid salt-forming group in the presence of a catalyst for the reaction, the improvement which comprises heating at the boiling temperature and at substantially atmospheric pressure a reaction mixture containing the said alpha-naphthylamine, primary amine and catalyst, and an amount of an inert organic liquid selected from the group consisting of the hydrocarbons and their chloro derivatives which, when mixed with the other ingredients of the reaction mixture, results in a mixture boiling within the range of about 185° to about 210° C.

9. In the production of an N-aryl-alpha-naphthylamine by reacting alpha-naphthylamine with a primary amine of the benzene series having the formula $$C_6H_3X_2NH_2$$

in which X represents hydrogen, an alkyl group, or an alkoxy group, in the presence of a catalyst for the reaction, the improvement which comprises heating at the boiling temperature and at substantially atmospheric pressure a reaction mixture containing the said alpha-naphthylamine, primary amine and catalyst, and an innocuous organic liquid in such an amount that the boiling temperature of the resulting reaction mixture is within the range of about 185° C. to about 210° C. at atmospheric pressure, and maintaining said reaction mixture boiling within said temperature range by adding said liquid to the reaction mixture while removing ammonia.

10. In the production of an N-aryl-alpha-naphthylamine by reacting alpha-naphthylamine with a primary amine of the benzene series having the formula $$C_6H_3X_2NH_2$$

in which X represents hydrogen, an alkyl group, or an alkoxy group, in the presence of a catalyst for the reaction, the improvement which comprises heating at the boiling temperature and at substantially atmospheric pressure a reaction mixture containing the said alpha-naphthlamine, primary amine and catalyst, and an amount of an inert organic liquid which, when mixed with the other ingredients of the reaction mixture, results in a mixture boiling within the range of about 185° to about 210° C. at atmospheric pressure, and maintaining said reaction mixture boiling within said temperature range by condensing and returning to the reaction mixture vapors given off from the boiling reaction mixture, while removing ammonia from said vapors.

11. In the production of an N-aryl-alpha-naphthylamine by reacting alpha-naphthylamine phthylamine by reacting alpha-naphthylamine with a primary amine of the benzene series having the formula $C_6H_3X_2NH_2$, in which X represents hydrogen, an alkyl group, or an alkoxy group, in the presence of a catalyst for the reaction, the improvement which comprises heating at the boiling temperature and at substantially atmospheric pressure a reaction mixture containing the said alpha-naphthylamine, primary amine and catalyst, and a chlor-substituted hydrocarbon of the benzene series in such an amount that the boiling temperature of the reaction mixture is within the range of about 185° to about 210° C. at atmospheric pressure, and maintaining said reaction mixture boiling within said temperature range by condensing and returning to the reaction mixture vapors given off from the boiling reaction mixture, while removing ammonia from said vapors.

12. In the production of an N-aryl-alpha-naphthylamine by reacting alpha-naphthylamine with a primary amine of the benzene series having the formula $C_6H_3X_2NH_2$, in which X represents hydrogen, an alkyl group, or an alkoxy group, in the presence of a catalyst for the reaction, the improvement which comprises heating at the boiling temperature and at substantially atmospheric pressure a reaction mixture containing the said alpha-naphthylamine, primary amine and catlyst, and a chlorbenzol in such an amount that the boiling temperature of the reaction mixture is within the range of about 185° to about 210° C. at atmospheric pressure, and maintaining said reaction mixture boiling within said temperature range by condensing and returning to the reaction mixture vapors given off from the boiling reaction mixture, while removing ammonia from said vapors.

13. In the production of an N-ethoxyphenyl-alpha-naphthylamine by reacting alpha-naphthylamine with a phenetidine in the presence of iodine as a catalyst for the reaction, the improvement which comprises heating at the boiling temperature and at substantially atmospheric pressure a reaction mixture containing the said alpha-naphthylamine, phenetidine and iodine, and chlorobenzene in such an amount that the reaction mixture boils within the range of about 185° to about 210° C. at atmospheric pressure, and maintaining said reaction mixture boiling within said temperature range by condensing and returning to the reaction mixture vapors given off from the boiling reaction mixture, while removing ammonia from said vapors.

14. In the production of an N-aryl-alpha-naphthylamine by reacting alpha-naphthylamine with a primary amine of the benzene series having the formula $C_6H_3X_2NH_2$, in which X represents hydrogen, an alkyl group, or an alkoxy group, in the presence of a catalyst for the reaction, the improvement which comprises heating at the boiling point and at substantially atmospheric pressure a reaction mixture containing the said alpha-naphthylamine and catalyst, and the said primary amine in sufficient excess of the amount theoretically required to cause the said reaction mixture to boil at a temperature within the range of about 185° C. to about 210° C. at atmospheric pressure, and continuing the heating at said temperature while maintaining the boiling temperature of said reaction mixture within said temperature range by condensing and returning to the reaction mixture vapors given off from the boiling reaction mixture, while removing ammonia from said vapors.

15. In the production of N-phenyl-alpha-naphthylamine by reacting alpha-naphthylamine with aniline in the presence of iodine as a catalyst for the reaction, the improvement which comprises heating at the boiling point at substantially atmospheric pressure a reaction mixture containing alpha-naphthylamine and iodine, and aniline in such excess of the amount theoretically required as to cause the said reaction mixture to boil at a temperature within the range of about 185° C. to about 210° C. at atmospheric pressure, continuing the heating at said temperature, and maintaining the boiling temperature of said reaction mixture within said temperature range by condensing and returning to the reaction mixture vapors given off from the boiling reaction mixture, while removing ammonia from said vapors.

16. The process of making o-ethoxyphenyl-alpha-naphthylamine which comprises heating at the boiling point a mixture containing alpha-naphthlamine, o-phenetidine, a catalytic amount of iodine, and chlorbenzene in such an amount that the reaction mixture boils at about 190° C. at atmospheric pressure, maintaining said reaction mixture boiling at approximately said temperature by condensing and returning to the reaction mixture vapors given off from the boiling mixture, while removing ammonia from said vapors, adding dilute sodium hydroxide to the reaction mixture, then subjecting the mass to fractional distillation, and separately collecting the fraction boiling at 230° to 232° C. under 10 to 12 mm. pressure.

17. The process of making o-ethoxyphenyl-alpha-naphthylamine which comprises heating at the boiling point at substantially atmospheric pressure a mixture containing alpha-naphthylamine, o-phenetidine, a catalyst for the condensation of alpha-naphthylamine with primary arylamines, and an amount of an innocuous substance such that the boiling temperature of said reaction mixture is considerably below the boiling temperature of o-ethoxyphenyl-alpha-naphthylamine, said substance being liquid under the conditions of the reaction.

FREDERICK H. KRANZ.